United States Patent [19]
Babineaux

[11] Patent Number: 5,791,773
[45] Date of Patent: Aug. 11, 1998

[54] HANDHELD STUDIO LIGHTING FIXTURE

[76] Inventor: James Babineaux, 2162 Chambers La., Grants Pass, Oreg. 97526

[21] Appl. No.: 642,315

[22] Filed: May 3, 1996

[51] Int. Cl.[6] .............................. F21V 17/06; F21V 1/08
[52] U.S. Cl. ..................... 362/352; 362/16; 362/355; 362/399; 362/361
[58] Field of Search ....................... 362/3, 16, 351, 362/352, 353, 311, 361, 355, 356, 357, 399, 809, 363

[56] References Cited

U.S. PATENT DOCUMENTS 4,167,034  9/1979  Noguchi ........................ 362/352
4,229,784  10/1980  Noguchi ........................ 362/311

*Primary Examiner*—Thomas M. Sember
*Attorney, Agent, or Firm*—Elliott N. Kramsky

[57] ABSTRACT

A light fixture for photography. A spherical lantern having a semi-transparent light-diffusing surface membrane is secured to a frame that includes a wand of inverted U-shape design. A crosspiece that spans the width of the wand includes a junction box upon which a socket is provided for receiving a light globe. The spherical surface of the surrounding lantern creates a light diffusing surface that softens and lessens the size of shadows cast by illuminated objects.

7 Claims, 2 Drawing Sheets

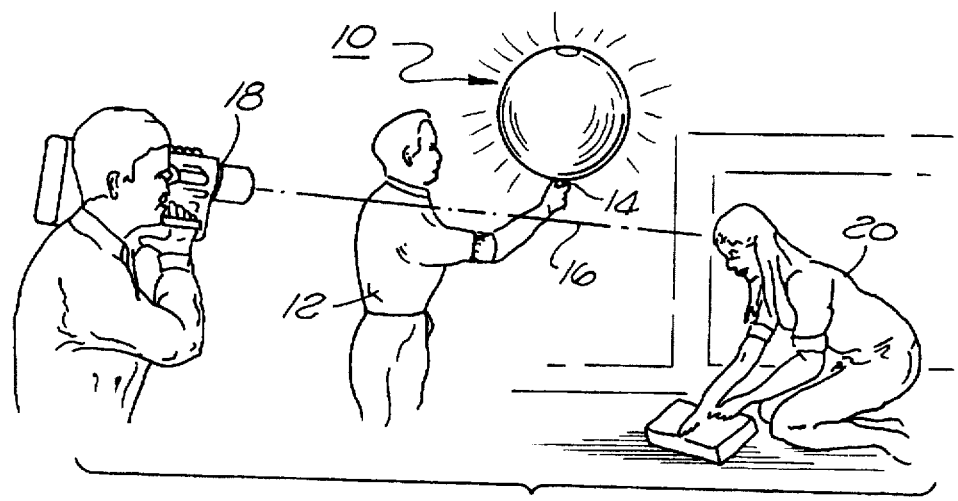
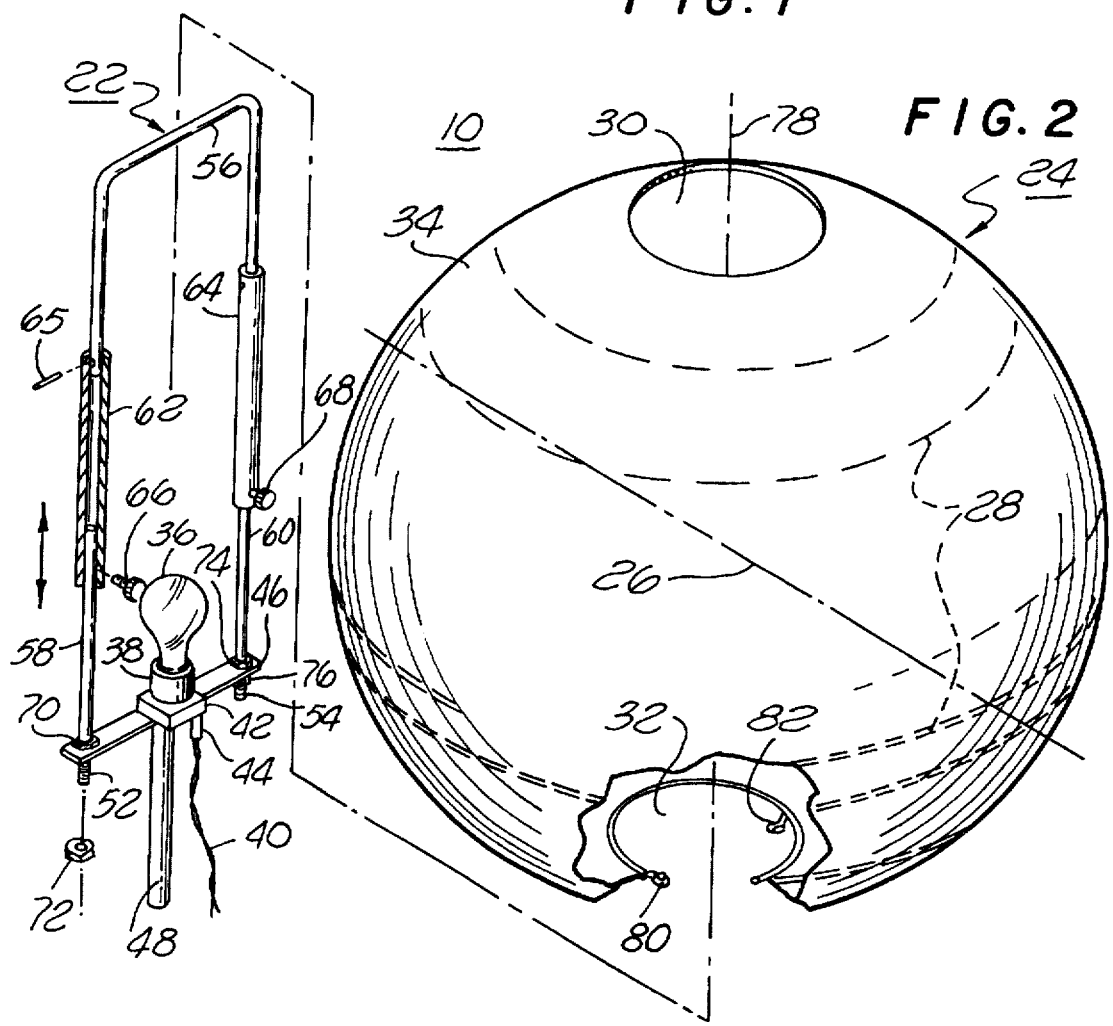
FIG. 1
FIG. 2

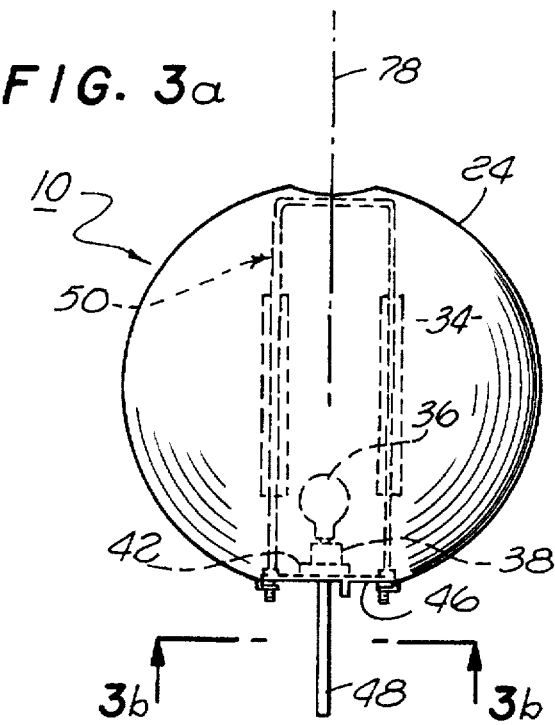
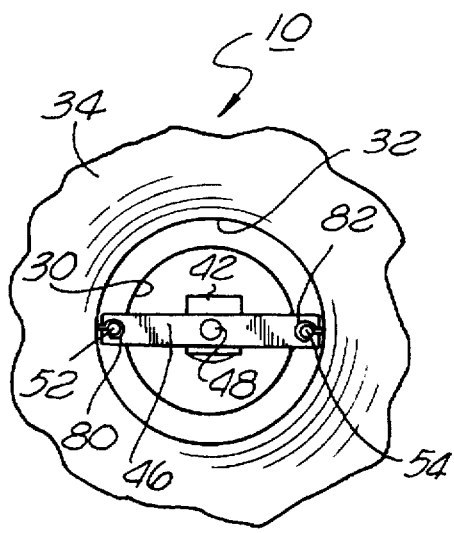
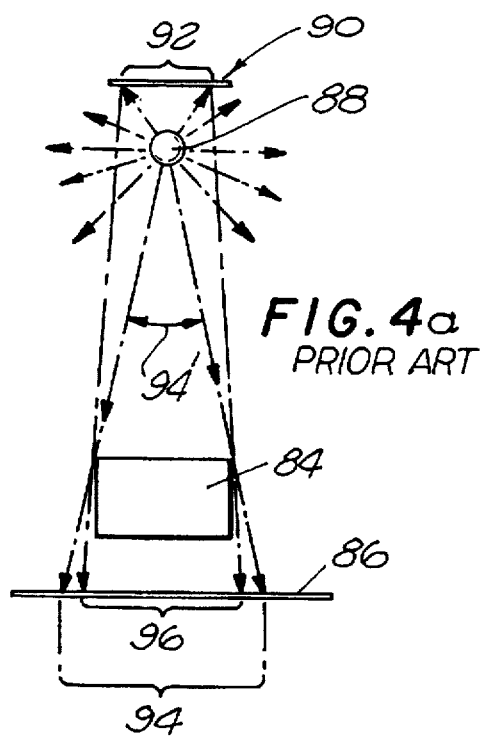
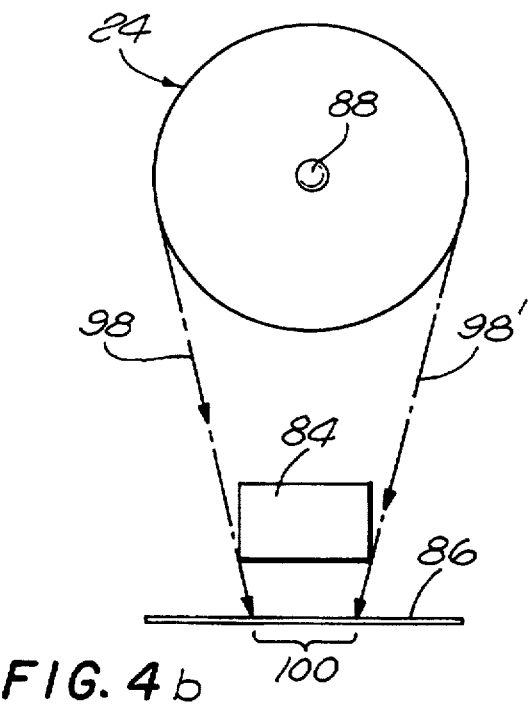

1

HANDHELD STUDIO LIGHTING FIXTURE

BACKGROUND

1. Field of the Invention

The present invention relates to lighting systems. More particularly, this invention pertains to photographic lighting employed for both motion and still photography that mimics ambient illumination, is substantially non-directional and minimizes shadowing effects.

2. Description of the Prior Art

Lighting quality often determines the quality of a photographic product, whether still or motion. Unnatural shadows impair photographic quality. Such shadows are often produced by directional studio lighting and are particularly destructive in the case of studio photography of supposedly "outside" shots.

A number of lighting systems have been employed in the past for generating lighting that lessens the oftentimes-stark appearance created by point sources. Such systems conventionally incorporate a back reflector for broadening the light beam generated by a high wattage globe. An example of such prior art apparatus is the product commercially available under the designation STUDIO SOFT LIGHT from Mole-Richardson. This system uses a back reflector whose surface is white. The system weighs approximately five to ten pounds, sufficiently heavy to complicate extended hand-held operation. Even with the broadening effect provided by the reflector, an undesirable degree of directionality remains. This is due, in part, to the finite size and opaqueness of the reflector. Further, systems of this type generate substantial amounts of heat, much of which is absorbed by the reflector and not dissipated. As mentioned earlier, systems of this type can become rather uncomfortable and difficult to manipulate over extended periods of hand-held use, limiting their flexibility of deployment.

SUMMARY OF THE INVENTION

The present invention addresses the aforesaid disadvantages of the prior art by providing a photographic fixture. The fixture includes a collapsible, substantially spherical lantern. Such lantern has a semi-transparent light diffusing surface. A frame is provided. The frame is arranged to support the substantially-spherical shape of the lantern. Means are engaged to the frame for receiving a light globe. A handle is fixed to the bottom of the frame.

The preceding and other features and advantages of this invention will become further apparent from the detailed description that follows. Such description is accompanied by a set of drawing figures. Numerals of the drawing figures, corresponding to those of the written description, point to the features of the invention. Like numerals refer to like features throughout both the written description and the drawing figures.

BRIEF DESCRIPTION OF THE DRAWINGS

FIG. 1 is an illustration of the photographic lighting fixture of the invention in hand-held use;

FIG. 2 is an exploded perspective view for illustrating the elements of the invention; and FIGS. 3(a) and 3(b) are side elevation and bottom plan views, respectively, of the lighting fixture of the invention with portions internal to the lantern in shadow outline; and FIGS. 4(a) and 4(b) are top plan views for illustrating the shadows cast by objects illuminated in accordance with the prior art and with the invention respectively.

DETAILED DESCRIPTION OF THE PREFERRED EMBODIMENT

Turning to the drawings, FIG. 1 is an illustration of the lighting fixture 10 of the invention in hand-held use. The fixture is shown deployed in the production of a television show. It is an important attribute of the lighting fixture 10 that it is of lightweight construction. This permits a stage assistant 12 to grasp and hold it substantially still by means of a protruding handle 14 for long periods of time without undue effort or discomfort. Since the fixture 10 is quite light in weight, the assistant 12 can easily keep it out of the line-of-sight 16 of a hand-held camera 18.

The camera 18 is shown pointing in the direction of an actor 20. An important determinant of the quality of the photography is the degree to which the presence of artificial light sources cannot be detected in the image of the subject actor 20 or her surroundings. The lighting fixture 10 of the invention is arranged to provide a lighting environment, mimicking the ambient light that emanates from the sun. Just as is the case with natural outdoor lighting, the light from the fixture 10 is substantially non-directional in contrast even to reflector-based systems that "broaden" the generated beam of light. The omnidirectional diffusion of light minimizes and softens shadows, resulting in more natural and pleasing images.

FIG. 2 is an exploded perspective view for illustrating the elements of the lighting fixture 10 of the invention. The two primary components of the fixture 10 comprise a frame 22 and a hollow spherical lantern 24 arranged for cooperative engagement as shown in the following figures. The lantern 24 may be of a type that is available in various sizes, is generally-spherical and is commonly designated a "China ball". The lantern 24 routinely includes a helical wire 28 that traces a spherical shape, forming a collapsible frame that gives the lantern 24 its spherical shape. The wire 28 continues from a circular upper aperture 30 to a (larger) circular lower aperture 32. The wire frame, and, thus, the lantern 24, is routinely collapsible about an equatorial axis 26.

The surface of the lantern 24 comprises a light diffusing membrane 34 of semi-transparent paper glued to the supporting wire 28. As will be seen, the light membrane 34 acts to diffuse light emitted from an enclosed point source to thereby produce desirable quasi-ambient lighting effects.

A globe 36 acts as a light source. The globe 36, which may comprise an incandescent bulb of from 75 to 500 watts, is threadedly received within a conventional porcelain electrical socket 38. The socket 38 is in electrical connection with a power source (not shown) through a cable 40 that enters a junction box 42 via a fitting 44.

The junction box 42 is fixed to a crosspiece 46. An elongated tubular handle 48 extends beneath the crosspiece 46. As shown in FIG. 1, the handle 48 allows the assistant 12 to grasp the lightweight fixture 10 for easy and flexible handling when hand-held lighting is called-for. In addition, the solid tubular handle 48 permits ready mounting of the lighting fixture 10 to such standard studio lighting fixtures as c-stands and baby plates by grip (a.k.a. bull head) clamps. Thus, the lighting-fixture 10 is entirely suitable for both hand-held and fixed-location usages.

The frame 22 comprises a three piece tubular member that is assembled into an inverted U-shape as shown that includes threaded end portions 52 and 54. Upper U-shaped section 56 is aligned and adjustably fixed to upright sections 58, 60 by means of tubular extension sleeves 62 and 64 respectively. Roll pins such as a pin 65 fix the upper ends of the extension sleeves 62, 64 to the U-shaped section 56 while set screws 66, 68 permit one to fix the overall height of the frame 22 after sliding the extension sleeves 62, 64 to desired positions with respect to the upright sections 58, 60 respectively. The adjustability of the frame 22 allows one to maintain the lantern 24 fully extended to a spherical shape despite the stretching of the membrane 34 that occurs over time. Fasteners 70, 72, 74 and 76 secure the end portions 52, 54 to the crosspiece 46 as illustrated. As can be seen, the threaded end portions 52 and 54 of the frame 22 extend through and beneath the crosspiece 46 where they are threadedly received by the fasteners 72 and 76. The U-shaped frame 22, including the crosspiece 46, forms the primary element for engaging the spherical lantern 24.

FIG. 3(a) is a side elevation view of the lighting fixture 10, with portions internal to the spherical lantern 24 in shadow outline for facilitating understanding thereof. The frame 22 is adjustably dimensioned to fully extend, fix and maintain the collapsible lantern 24 in a generally-spherical shape. The spiral reinforcing wire 28 assures that the lantern 24 will assume such shape when fully extended along an axis 78.

FIG. 3(b) is a bottom plan view of the assembled lighting fixture 10. As can be seen, the circular lower aperture 32 of the member 24 includes diametrically opposed hooks 80, 82. The hooks 80 and 82 are so located to receive the extended end portions 52 and 54 of the frame 22. Such engagement fixedly extends the collapsible lantern 24 along the axis 78 to assume and maintain the desired spherical shape. Thus, the technician or assistant 12 need not be worried about collapse of the lantern 24 during use of the fixture 10.

A brief description of the theory behind the claimed invention follows. In particular, an exposition is provided of the manner in which highly-realistic ambient lighting effects may be attenuated by the invention in contrast to both point source and reflectoraided prior art systems. While the exposition is believed to be correct, neither the invention nor its operation is dependent upon its accuracy or completeness.

FIGS. 4(a) and 4(b) are top plan views for illustrating the shadows cast by objects illuminated in accordance with the prior art and the invention respectively. Turning to FIG. 4(a), an object 84 is placed in front of a screen 86. Illumination is provided by a bulb 88 that acts as a point source. A reflector 90 is located behind the bulb 88 in the manner of STUDIO SOFT LIGHT and like beam-broadening systems of the prior art to soften and lessen the directionality of the output light.

The reflector 90 is necessarily of a finite width 92. As a consequence, the degree of diffusion of light is correspondingly limited. As shown, without a reflector 90, light from the point source 88 creates a shadow of width 94 on the screen 86. Rays of light from the source 88 within a cone angle 94' are blocked by the opaque object 84 to create the shadow. The addition of the reflector 90 reduces the width 96 of the shadow upon the screen 86 somewhat as rays reflected from its outer edges now define a smaller ray blocking cone angle 80" than before. Further, rays reflected from the extreme edges of the reflector 90 are more removed from the point source 88 than those reflected from its central region. As a result, the edges of the shadow cast upon the screen 86 are slightly "softer" or "grayer" than would be the case in the absence of a beam-broadening reflector 90.

As seen in FIG. 4(b), the lantern 24 diffuses light from the point source 88 to a much greater extent than would a reflector. The surface of the lantern 24 converts a small and intense point source (the bulb 88) into a relatively large, spherical and diffuse source. The surface of the lantern 24 serves as the locus of an infinite number of point sources of substantially equal intensity (each being less than the intensity of the light emitted at the central source 88 by a factor $1/r^2$ where r is the radius of the lantern 24.)

The extent of the "new" source may easily exceed the opaque object 84. As a consequence, the light "thrown" by the fixture of the invention may well include rays directed "inwardly" between the object 84 and the screen 86. In effect, the lantern 24 acts like a very large frosted globe. The surface of the lantern 24 is itself omnidirectional, including inwardly-directed rays 98, 98' that radiate from its diametrically-opposed edges. The resultant shadow eclipse projected onto the screen 86 is of substantially lesser width 100 than a shadow resulting from light thrown by a reflector or point source system. Furthermore, as the light casting the shadow in FIG. 4(b) is emitted from a large and diffuse source rather than a non-directional but intense point source (the globe 88) or a broadened directional derivative (via the reflector 90), the resultant shadow is significantly softened by penumbras at its edges. Accordingly, the effect of light emitted from the light fixture 10 mimics soft ambient light, an effect not accomplished by the directional sources of the prior art. The ready portability of the fixture 10, permitting the assistant 12 to bring the fixture 10 as close to the object as desired, further enhances the light "wrap-around" capability of the invention.

Thus it is seen, that the present invention provides an improved lighting fixture that is particularly useful for creating ambient lighting effects within a studio. While this invention has been disclosed with reference to its presently preferred embodiment, it is not limited thereto. Rather, this invention is limited only insofar as it is defined by the following set of patent claims and it includes within its scope all equivalents thereof.

What is claimed is:

1. A supportable lighting fixture comprising, in combination:
    a) a collapsible, substantially spherical lantern;
    b) said lantern having a semi-transparent light-diffusing surface;
    c) a frame, said frame including a member of inverted U-shape comprising a top and a pair of opposed, substantially parallel legs arranged to support said substantially-spherical shape said lantern;
    d) said frame also including a crosspiece having an upper surface and a lower surface, said crosspiece spanning and being fixed to said opposed legs of said member;
    e) means engaged to said frame for receiving a light bulb; and
    f) a handle fixed to the lower surface of said crosspiece.

2. A fixture as defined in claim 1 wherein said lantern further includes:
    a) a continuous wire, said wire extending from a circular upper aperture to a circular lower aperture along a helical path therebetween of varying amplitude to define a generally-spherical shape; and
    b) said semi-transparent light-diffusing surface comprising a membrane, said membrane being fixed to said wire frame.

3. A fixture as defined in claim 2 wherein:
    a) said lower circular aperture includes diametrically-opposed hooks; and
    b) said opposed legs of said frame engage said hooks.

4. A fixture as defined in claim 3 wherein said handle is fixed to said crosspiece.

5. A fixture as defined in claim 4 wherein:

a) a junction box is fixed to the upper surface of said crosspiece; and b) an electrical socket is fixed to said junction box.

6. A fixture is defined in claim 5 wherein said substantially-straight handle is fixed to the lower surface of said crosspiece approximately midway between said opposed legs.

7. A fixture as defined in claim 2 wherein each of said legs further comprises:

a) a substantially vertical upper portion integral with said top of said frame;

b) a lower portion;

c) means for slidably engaging said lower portion to said upper portion whereby the height of said frame is adjustable; and d) said last-named means including means for selectively fixing the height of said frame.

* * * * *